United States Patent
Milnes et al.

(10) Patent No.: US 8,497,934 B2
(45) Date of Patent: Jul. 30, 2013

(54) ACTIVELY ADDRESSABLE APERTURE LIGHT FIELD CAMERA

(75) Inventors: Thomas B. Milnes, Beverly, MA (US); Douglas P. Hart, Charlestown, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 354 days.

(21) Appl. No.: 12/952,670

(22) Filed: Nov. 23, 2010

(65) Prior Publication Data
US 2011/0128412 A1 Jun. 2, 2011

Related U.S. Application Data

(60) Provisional application No. 61/264,452, filed on Nov. 25, 2009.

(51) Int. Cl.
*G02F 1/00* (2006.01)
*H04N 5/238* (2006.01)

(52) U.S. Cl.
USPC .......................... 348/369; 359/322; 348/363

(58) Field of Classification Search
USPC ................. 359/237, 245, 290, 322; 348/239, 348/335, 369, 362, 363
See application file for complete search history.

(56) References Cited

U.S. PATENT DOCUMENTS

| | | | |
|---|---|---|---|
| 5,703,677 A | 12/1997 | Simoncelli et al. | |
| 5,850,485 A | 12/1998 | Hart | |
| 6,324,347 B1 | 11/2001 | Bacs et al. | |
| 6,348,990 B1 | 2/2002 | Igasaki et al. | |
| 7,576,308 B1 * | 8/2009 | Gruneisen et al. | 250/201.9 |
| 8,155,456 B2 * | 4/2012 | Babacan et al. | 382/232 |
| 8,228,417 B1 * | 7/2012 | Georgiev et al. | 348/335 |
| 2004/0047030 A1 | 3/2004 | MacAulay | |
| 2008/0031513 A1 | 2/2008 | Hart | |

(Continued)

FOREIGN PATENT DOCUMENTS

| | | |
|---|---|---|
| KR | 10200514722 | 2/2005 |
| WO | WO-93/21624 | 10/1993 |

OTHER PUBLICATIONS

Adelson, Edward H. et al., "The Plenoptic Function and the Elements of Early Vision", Computational Models of Visual Processing; MIT Press (1991), pp. 3-20.
International Search Report and Written Opinion of PCT/US2010/057792 dated Aug. 3, 2011.
NG, Ren et al., "Light Field Photography with a Hand-held Plenoptic Camera", Stanford University, Stanford Tech Report, CTSR Feb. 2005.

(Continued)

*Primary Examiner* — Jason Whipkey
(74) *Attorney, Agent, or Firm* — Foley & Lardner LLP

(57) ABSTRACT

An actively addressable aperture disposed ahead of the rear surface of a camera lens allows the camera to capture a full-resolution, five-dimensional (5D) light field that describes every possible view from every possible angle of the scene being imaged. Shifting the aperture over the entire aperture plane and acquiring an image at each step yields a 2D grid of 2D images of the scene, otherwise known as a 4D parameterized light field. Estimating the 3D depth of the objects in the imaged scene yields a 3D model with 2D surface irradiance patterns, which is the full, non-parameterized 5D light field. The 5D light field can be used to display perspective changes in a way that mimics cognitive processing of the same scene or object. 5D light fields can also be used to create high-precision, 3D depth maps suitable for 3D movies, interactive displays, machine vision, and other applications.

35 Claims, 14 Drawing Sheets

U.S. PATENT DOCUMENTS

2008/0124070 A1 5/2008 Liang et al.
2008/0212838 A1 9/2008 Frigerio
2009/0109518 A1* 4/2009 Atkin .......................... 359/290
2010/0039534 A1 2/2010 Hart et al.
2010/0265386 A1 10/2010 Raskar et al.

OTHER PUBLICATIONS

Ren, Hongwen et al., "Adaptive liquid crystal lens with large focal length tenability", Optics Express, vol. 14, No. 23, Nov. 13, 2006.

* cited by examiner

ACTIVELY ADDRESSABLE APERTURE LIGHT FIELD CAMERA

RELATED APPLICATION

This application claims the benefit of U.S. Provisional Application No. 61/264,452, filed on Nov. 25, 2009, the entire teachings of which are incorporated herein by reference.

GOVERNMENT SUPPORT

This invention was made with government support under Grant No. NA06OAR4170019 awarded by the Department of Commerce—NOAA. The government has certain rights in the invention.

BACKGROUND

A full, five-dimensional (5D) light field describes every possible view, from every possible angle, within the bounds of the region characterized by the light field. That is, the 5D light field, which is also known as the 5D plenoptic function, is a measure of the radiance as a function of three spatial coordinates, x, y, and z, and two angular coordinates, $\phi$ and $\theta$. The radiance of rays propagating in empty regions remains constant, however, so one dimension of a 5D light field associated with an empty region contains redundant information. As a result, the light field describing an empty region can be characterized completely by measuring just four dimensions, which can be obtained in parallel planes.

4D light fields can be constructed from 2D images acquired at different planes with a conventional camera. For the 4D light field to be constructed precisely, however, the camera must be positioned precisely and/or its position must be precisely calibrated to the position of the light field's source. Although high-precision stages can be used to position the camera precisely, stages are bulky, move slowly, and draw large amounts of power. Moving the camera, then calibrating its position, also tends to be slow and may require additional equipment. Thus, conventional cameras are not suitable for measuring 4D light fields associated with moving objects.

Alternatively, 4D light fields can be constructed from multiple 2D images acquired in parallel from different angles or positions. For example, simultaneously capturing 2D images of a moving object with an array of cameras yields enough data to reconstruct the corresponding 4D light field. Camera arrays tend to be bulky, however, so they are not suitable for applications where small size is important, such as consumer photography.

Plenoptic cameras also capture multiple 2D images in parallel with a microlens array situated at the focal plane of a bulk lens. Each microlens images the aperture of the bulk lens onto a 2D detector array, which has multiple detector elements per microlens. Processing the array of images produced by the microlenses and captured by the detector array yields the 4D light field associated with the scene viewed by the bulk lens. Although plenoptic cameras can be quite compact, their resolution is much lower than the resolution of conventional cameras or camera arrays because they use just a few detector elements per microlens. For instance, using a 2000×2000 element detector array to capture images from 10,000 microlenses leaves only 400 detector elements per image. In addition, the microlenses must be aligned very precisely to the bulk lens and the detector array. Further, a plenoptic camera cannot be used to take conventional pictures.

SUMMARY

Embodiments of the present invention include cameras for and corresponding methods of generating representations of the 4D and 5D light fields associated with an object by acquiring a series of spatially modulated 2D images. Example cameras have an imaging lens that produces an image of the object at an image plane located a distance L from the lens. An actively addressable aperture defined by a spatial light modulator (SLM), which has a pixel pitch of $\Lambda$, disposed between the object and the image plane spatially modulates the light field associated with the object depending on commands from a processor. A detector in the image plane senses two or more 2D images transmitted or reflected through the actively addressable aperture, where each image corresponds to a different modulation pattern. The detector's active area has a maximum transverse dimension of about $D<2L\lambda/\Lambda$, where $\lambda$ is a wavelength of the two-dimensional images sensed by the detector. The processor generates the representations of the 4D (and possibly 5D) light fields associated with the object based on the two-dimensional images sensed by the detector.

In some cameras, the lens has a focal length F that is within a range of distances from about L to about 2L; depending on the exact choice of F, the camera can image objects from 2L to infinity.

Example cameras may also include a stop that limits the angular field of view of the camera to an angle about equal to the inverse sine of the ratio of the wavelength to the pixel pitch, i.e., to about $\arcsin(\lambda/\Lambda)$. In some cases, the angular field of view may be about 20 degrees, about 10 degrees, about 5 degrees, or less. Alternatively, or in addition, the stop may limit the angle of incidence of light onto the SLM to within a range of angles from 20 degrees, about 10 degrees, or even about 5 degrees about an axis perpendicular to a plane defined by the actively addressable aperture. These example cameras may further include a relay lens that images the object to the plane of the stop, which is imaged onto the detector by the imaging lens.

In some cases, the imaging lens is a compound lens that includes a first optical element disposed between the SLM and the object and a second optical element disposed between the SLM and the image plane. The first and second optical elements may be Fresnel lenses, and the compound lens may be used with the relay lens and/or stops described above.

The SLM, which can be transmissive or reflective, may be bonded to the lens or between lens elements. It may also be configured to define an edge of the actively addressable aperture by selectively partially transmitting or reflecting light in response to a signal from the processor. The processor may vary the shape, position, size, and/or transmissivity/reflectivity of the actively addressable aperture in response to one or more of the two-dimensional images sensed by the detector. The processor can also or alternatively vary the actively addressable aperture according to a predetermined pattern. In addition, the processor can store and retrieve data indicative of the acquired 2D images and derived 4D and 5D light fields in memory.

Compared with prior cameras for and methods of capturing 5D light fields, the present cameras and methods are simpler, faster, and more adaptable to other applications, including conventional photography. In addition, the present cameras and methods address problems of diffractive ghosting associated with SLMs. Using micromirror-based SLMs to define the actively addressable aperture increases the optical throughput compared to liquid-crystal SLMs and, in certain geometries, enables correction of coma and other aberrations.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Cameras that include actively addressable apertures, otherwise known as digital apertures, digitally controlled apertures, and programmable apertures, may be used to capture full-resolution, five-dimensional (5D) light fields. Systematically moving the actively addressable aperture over the entire aperture plane and taking an image at each position yields a 2D grid of 2D photos that can be assembled into a 4D parameterized light field. The many different-perspective images can be used to calculate the 3D depth of the object(s) being imaged, resulting in a 3D model with 2D surface irradiance patterns, which is the full 5D, non-parameterized light field. The 5D light field is a complete physical model of the light emanating from a scene that can be used to display perspective changes in the natural, intuitive way that our brains would process the same scene. The 5D light field can also be used to calculate 3D depth maps precise enough for use in science and engineering applications, including machine vision and autonomous navigation.

The apertures and methods described herein represent a convergent technology, allowing a single camera to do everything from light field capture to simple point-and-shoot, all through the elegant, digital manipulation of the aperture. The actively addressable aperture can be used in other ways as well. For example, 3D movies, like the ones used in motion pictures, can be generated using images captured with quickly alternating left- and right-hand apertures. When viewed with 3D displays, such as color and polarized anaglyph projection systems and autostereoscopic displays, the resulting picture appears 3D, "popping" off the screen. Actively addressable apertures can also be used to smoothly control the diameter of a transparent circle at the center of the optical path, just like traditional mechanical apertures.

Light Field Cameras with Actively Addressable Apertures

The crux of the technology comes from using an actively addressable aperture, such as a spatial light modulator (SLM), to filter light transmitted through a camera lens to a detector array. Unlike traditional cameras, which use a mechanical aperture that opens a variable-diameter hole in the middle of the optical path, the inventive camera uses an actively addressable aperture whose position, shape, and size can be varied. (For instance, changing aperture position enables ultrafast, high-resolution 3D imaging according to techniques and principles similar to those disclosed in U.S. Patent Application Publication No. 2008/0031513, filed on Mar. 19, 2007, by Douglas P. Hart, incorporated herein by reference in its entirety.) Suitable actively addressable apertures include transmissive and reflective spatial light modulators (SLMs), such as liquid crystal SLMs (LC-SLMs), variable-aperture shutters, and micromirror-based SLMs.

Figure 1A:
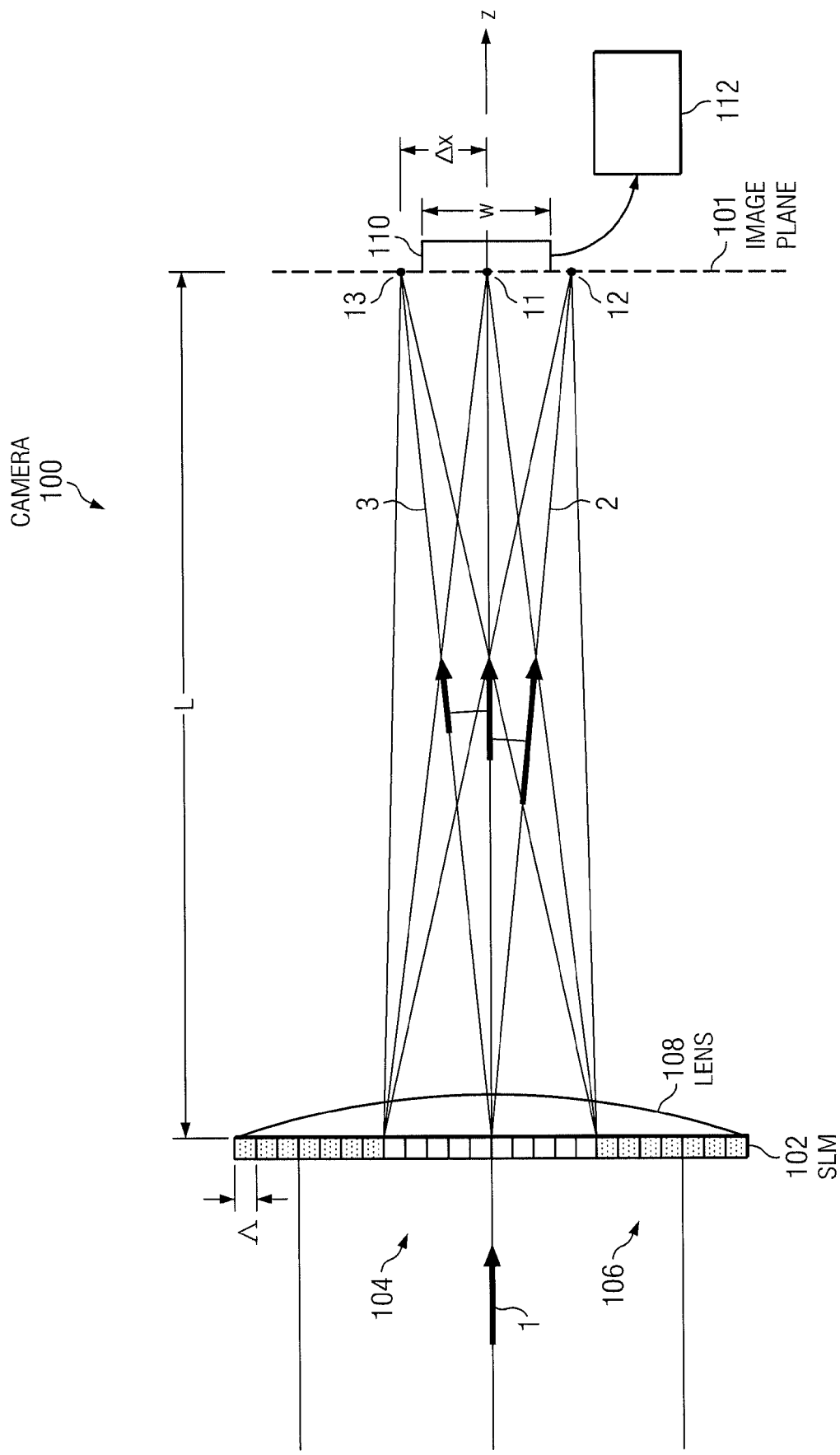
FIGS. 1A and 1B are schematic diagrams of a light field camera with an actively addressable aperture defined by a spatial light modulator (SLM) with a pixel pitch Λ that illustrate how to avoid the deleterious effects of diffraction of incident light by the SLM.
Figure 1B:
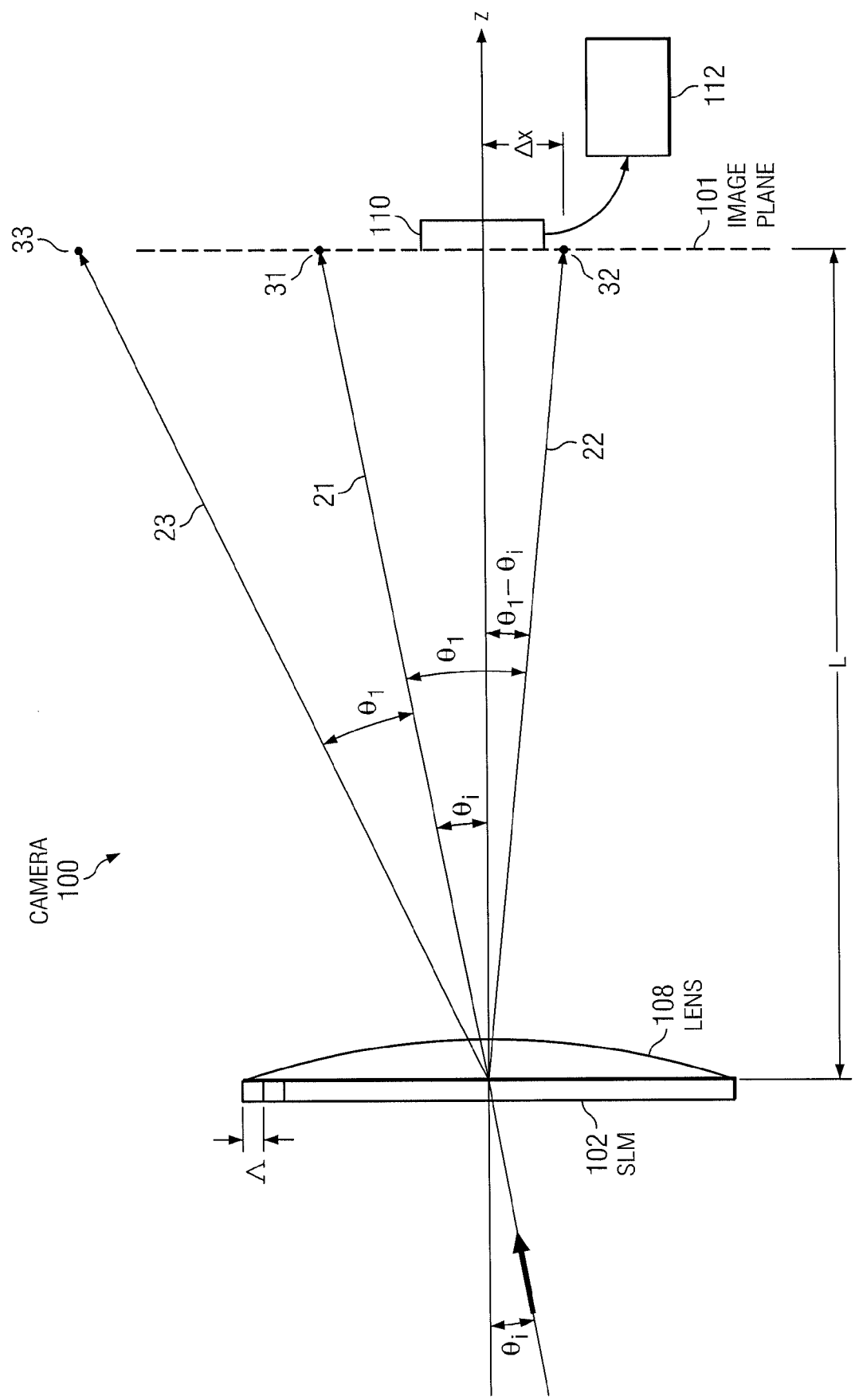

FIGS. 1A and 1B show a light field camera 100 that includes an actively addressable aperture 104 defined by one or more transparent elements in an SLM 102 at the camera input. In some cases, the camera 100 may be constructed by retrofitting a conventional digital camera with an SLM 102. A lens 108 images an object (not shown) onto a detector array 110 via the actively addressable aperture 104, which transmits light incident on the transparent element(s) defining the actively addressable aperture 104. Opaque elements 106 in the SLM 102 block the rest of the incident light.

The detector array 110, which is located in the lens's image plane 101, senses a 2D image that a processor 112 uses to construct the 5D light field associated with the scene viewed by the camera 100. To construct the 5D light field, the processor 112 identifies and compares similar object regions in multiple images and calculates depth based on the relative translation of the identified object region from one image to the next to produce a 3D depth map. Next, the processor 112 finds the radiance at every point in the 3D depth map for each image in which the point is visible. Computing the variation in radiance as a function of depth throughout the 3D depth map yields the depedence of the radiance on tip and tilt (φ and θ). Combining the two-dimensional angular variation information with the 3D depth map gives the full 5D light field.

The size, shape, and position of the actively addressable aperture 104 can be altered by selectively changing the transmissivity or reflectivity of the elements in the SLM 104. For example, applying an electric field to pixels in an LC-SLM causes the pixels to change from an opaque state to a transparent (translucent) state. Turning a cluster of pixels "transparent" effectively opens an aperture at that spot in the optical path. Similarly, (partially) opening or closing shutters on a shutter-based SLM changes the size, shape, and/or position of the actively addressable aperture defined by the shutter-based SLM.

In some cases, the processor 112 may shift a pinhole-like aperture in rasterlike fashion through the SLM 102 by selectively activating and de-activating single elements in the SLM 102. In other cases, the processor 112 may shift or vary the aperture 104 in response to changes in the scene, quality (e.g., signal-to-noise ratio) of the acquired 2D image, or commands from a user or processor. The processor 112 may also actuate the SLM 102 to form apodized apertures (i.e., apertures with "soft edges" whose transmissivity or reflectance trails off smoothly) that are less likely to exhibit undesired edge effects, such as ringing.

If the number of elements in the SLM is greater than the number of angles (or spots) that the lens can resolve, then the camera can be used to generate a "super image" of higher resolution than any raw image captured with the camera. Consider, for example, two images of a scene acquired with apertures shifted with respect to each other by a distance corresponding to half the minimum spot size (or half the smallest resolvable angle) associated with the lens. This pair of images can be used to generate a composite image with double the resolution of either of the original images. Similarly, aggregating or assimilating many different samplings of the same object results in a composite image with resolution better than that of the lens.

The SLM 102 also behaves as a thin amplitude grating that diffracts incident light to produce undesired "ghost images" in the image plane. To see how, consider an SLM illuminated by coherent light from a single point at infinite remove. As is well understood in optics, the SLM diffracts the incident beam into diffracted beams of orders m at angles $\theta_m$:

$$\sin \theta_m = \sin \theta_i + (m\lambda/\Lambda), \quad (1)$$

where $\theta_i$ is the incidence angle of the undiffracted beam, $\Lambda$ is the (grating) pixel pitch, and $\lambda$ is the wavelength of the incident light. For small angles and small values of $\lambda/\Lambda$, the interbeam angle $\theta_1$ of the first-order diffracted beam (m=1) is approximately:

$$\theta_1 = \theta_i + \lambda/\Lambda. \quad (2)$$

Figure 1C:
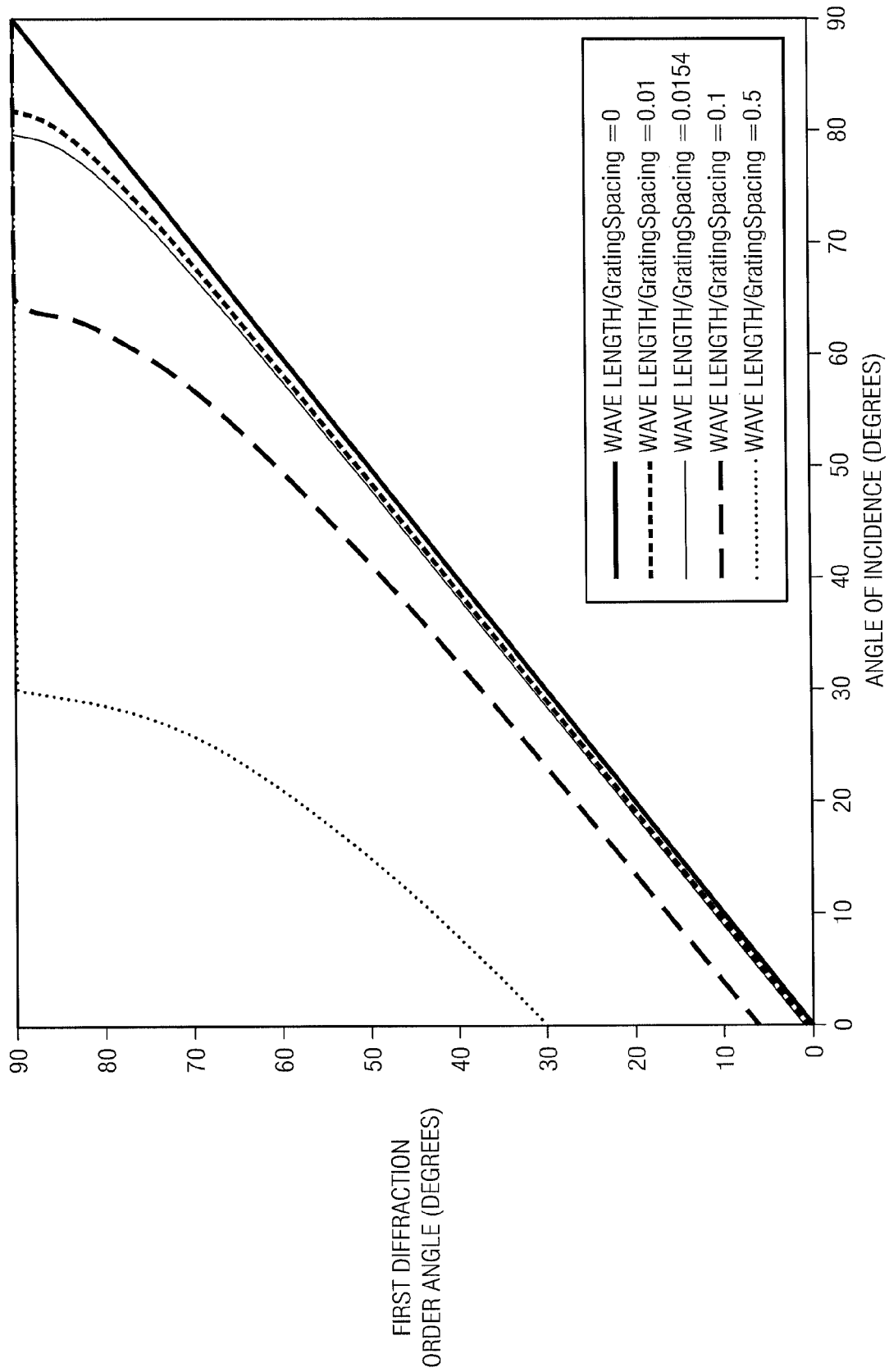
FIG. 1C is a plot of interbeam angle $\theta_1$ between undiffracted and first-order diffracted beams versus angle of incidence $\theta_i$ for different ratios of wavelength λ to pixel pitch Λ.

FIG. 1C is plot of the first-order interbeam angle, $\theta_1$, versus the incidence angle, $\theta_i$, for various values of the wavelength/pixel pitch ratio, $\lambda/\Lambda$. In general, the interbeam angle increases linearly with the incidence angle until the incidence angle reaches about 60°, at which point the interbeam angle begins increasing superlinearly with incidence angle.

FIG. 1A shows that a beam 1 incident at normal incidence (i.e., $\theta_i=0$) produces first-order diffracted beams 2 and 3 that are distributed symmetrically about the optic axis z. (The higher-order diffracted beams are omitted for clarity.) In this case, the incident beam 1 represents light from an object located infinitely far away, which the lens 108 images to a spot 11 at an image plane a distance L from the lens 108. (Here, the image plane 101 happens to be in the focal plane of the lens 108, i.e., L=F, the focal length of the lens.)

The diffracted beams 2 and 3 also produce diffracted spots 12 and 13 in the image plane 101 that are offset from the center of the detector 110 by an amount $\Delta x \approx L\lambda/\Lambda$. If the diffracted spots 12 and 13 fall onto the active area of the detector 110, then the detector 110 will sense aliased images, or ghost images, of the object in addition to the desired image, spot 11. Moreover, these ghost images may be blurry due to the wavelength dependence of the interbeam diffraction angle.

Fortunately, it is possible to prevent the detector 110 from sensing ghosts by choosing a detector 110 with a small enough active area and/or a large enough distance L between the lens 108 and the image plane 101 for a given ratio of wavelength to pixel pitch $\lambda/\Lambda$. For example, choosing the width W of the detector's active area to be less than $2\Delta x \approx 2L\lambda/\Lambda$, as shown in FIG. 1A, prevents the detector 110 from sensing undesired ghost images (e.g., diffracted spots 12 and 13) associated with a beam 1 that illuminates the SLM 102 at normal incidence. Setting the wavelength, $\lambda$, to the minimum wavelength sensed by the detector 110 should guarantee that the detector 110 does not sense much (if any) diffracted light.

Increasing the angle of incidence causes the interbeam angle $\theta_1$ to change, which in turn causes the diffracted spots to move relative to the center of the detector 110. For example, a beam 21 incident on the SLM 102 at angle $\theta_i$ produces diffracted beams 22 and 23, which in turn yield spots 32 and 33. Solving for the offset, $\Delta x$, of the lower spot 32 from the center of the detector 110 as a function of incidence angle $\theta_i$ yields:

$$\Delta x = L \tan [\sin^{-1}(\sin \lambda_1 + \lambda/\Lambda) - \theta_i]. \quad (3)$$

For sufficiently small incidence angles and ratios of wavelength to pixel pitch, the offset is approximately $L\lambda/\Lambda$—the lower spot 32 does not move (much) with respect to the detector 110. As the incidence angle gets bigger, however, the lower spot 32 starts to move towards the center of the detector 110, and eventually falls onto the detector's active area.

Figure 1D:
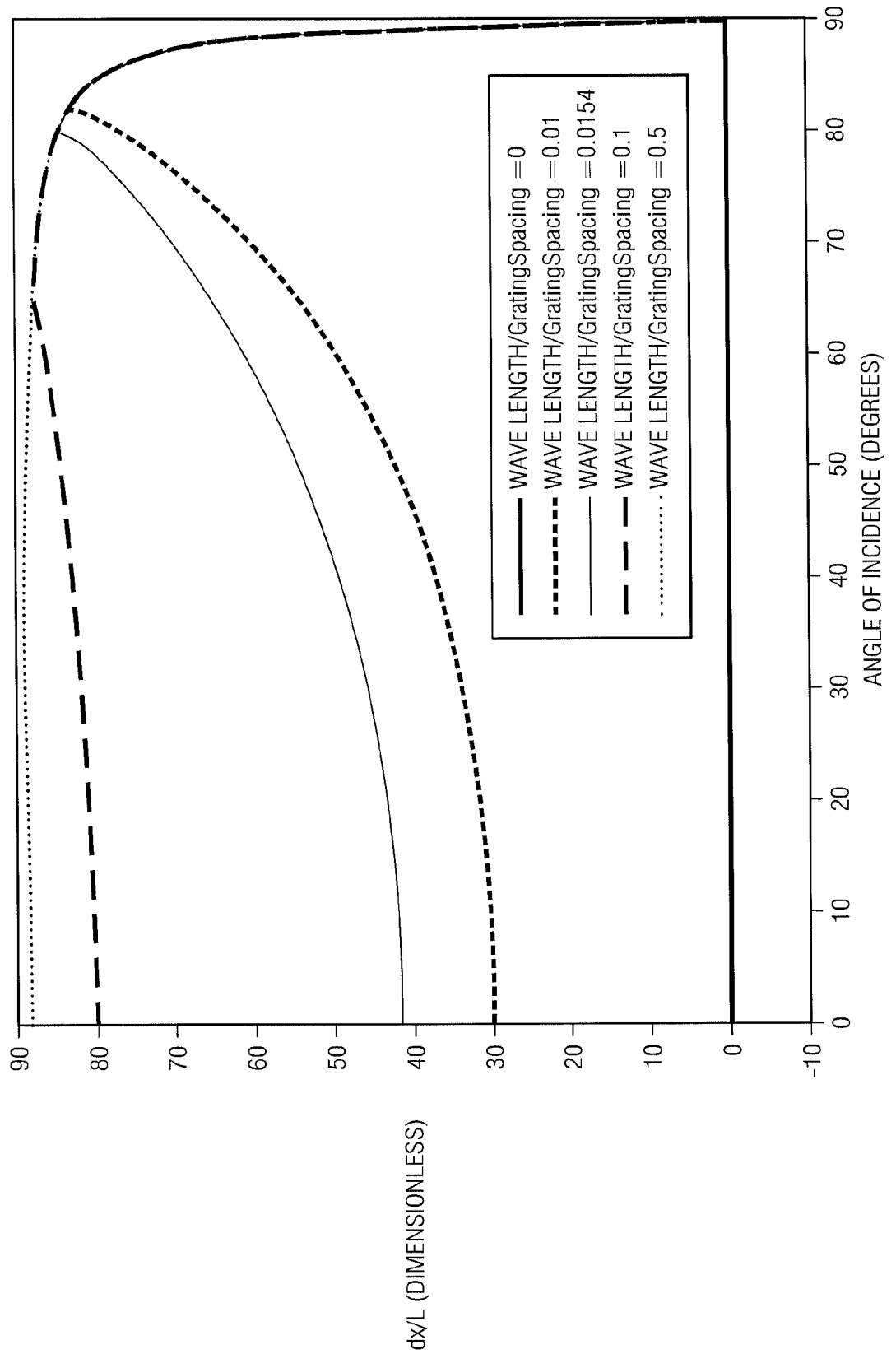
FIG. 1D is a plot of normalized displacement Δx/L of the first-order diffracted spot versus angle of incidence $\theta_i$ for different ratios of wavelength λ to pixel pitch Λ.
Figure 1E:
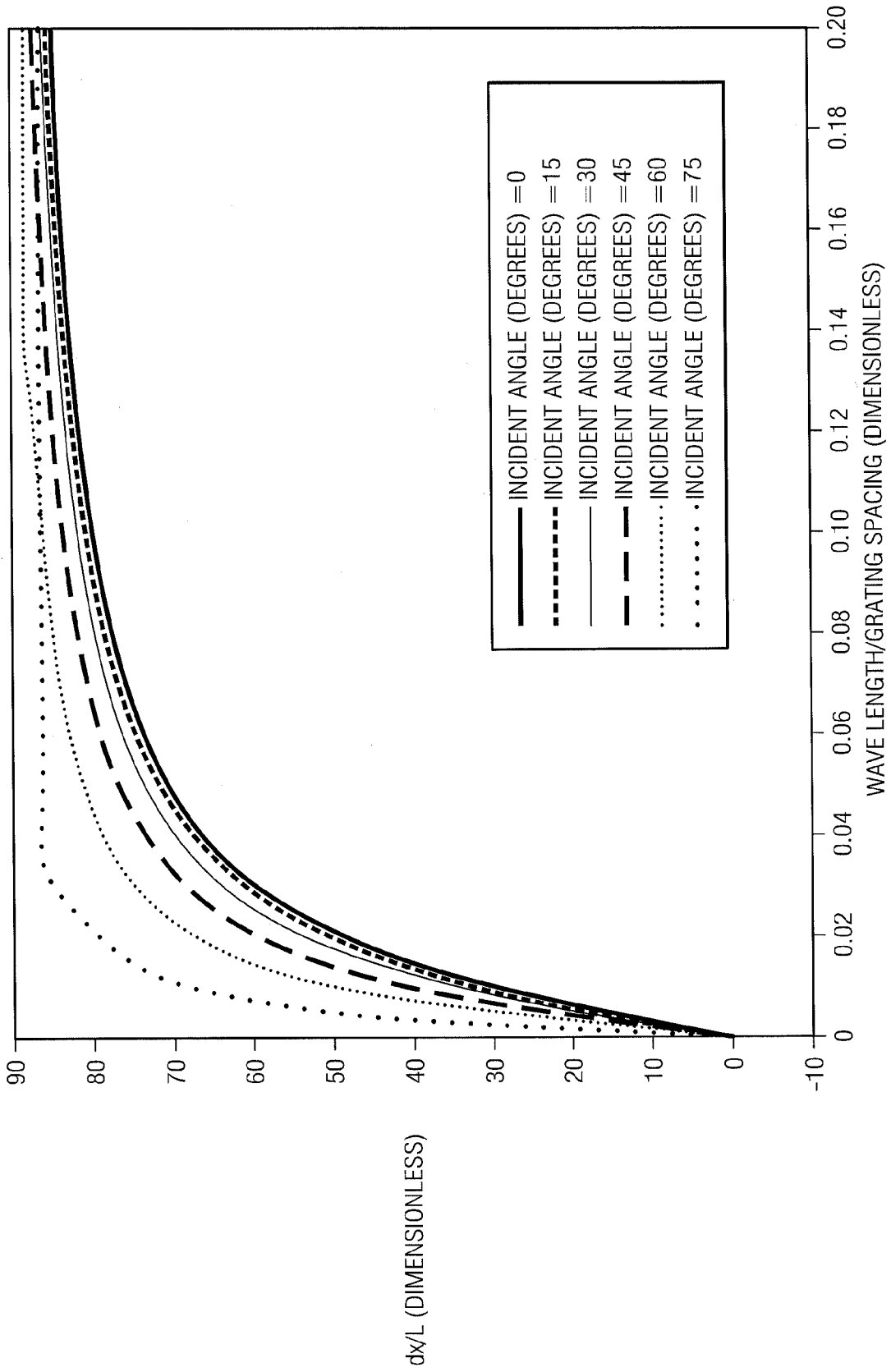
FIG. 1E is a plot of normalized displacement Δx/L of the first-order diffracted spot versus the ratio of wavelength λ to pixel pitch Λ for different angle of incidence $\theta_i$.

FIGS. 1D and 1E are plots that illustrate the dependence of the offset, $\Delta x$, (normalized by the distance between the lens and the image plane) on the incidence angle and the ratio of wavelength to pixel pitch. FIG. 1D shows that $\Delta x/L$ remains relatively constant for small incidence angles and small values of $\lambda/\Lambda$. The plots in FIGS. 1D and 1E can be used to determine the optimum ratio of wavelength to pixel pitch, optimum range of incidence angles, and/or optimum length L given a desired range camera size or performance. Alternatively, the angular field of view for the imaging lens 108 can be set to $\arcsin(\lambda/\Lambda)$ to ensure that ghost images do not illuminate the active area of the sensor 110.

Stops and Relay Lenses

Figure 2A:
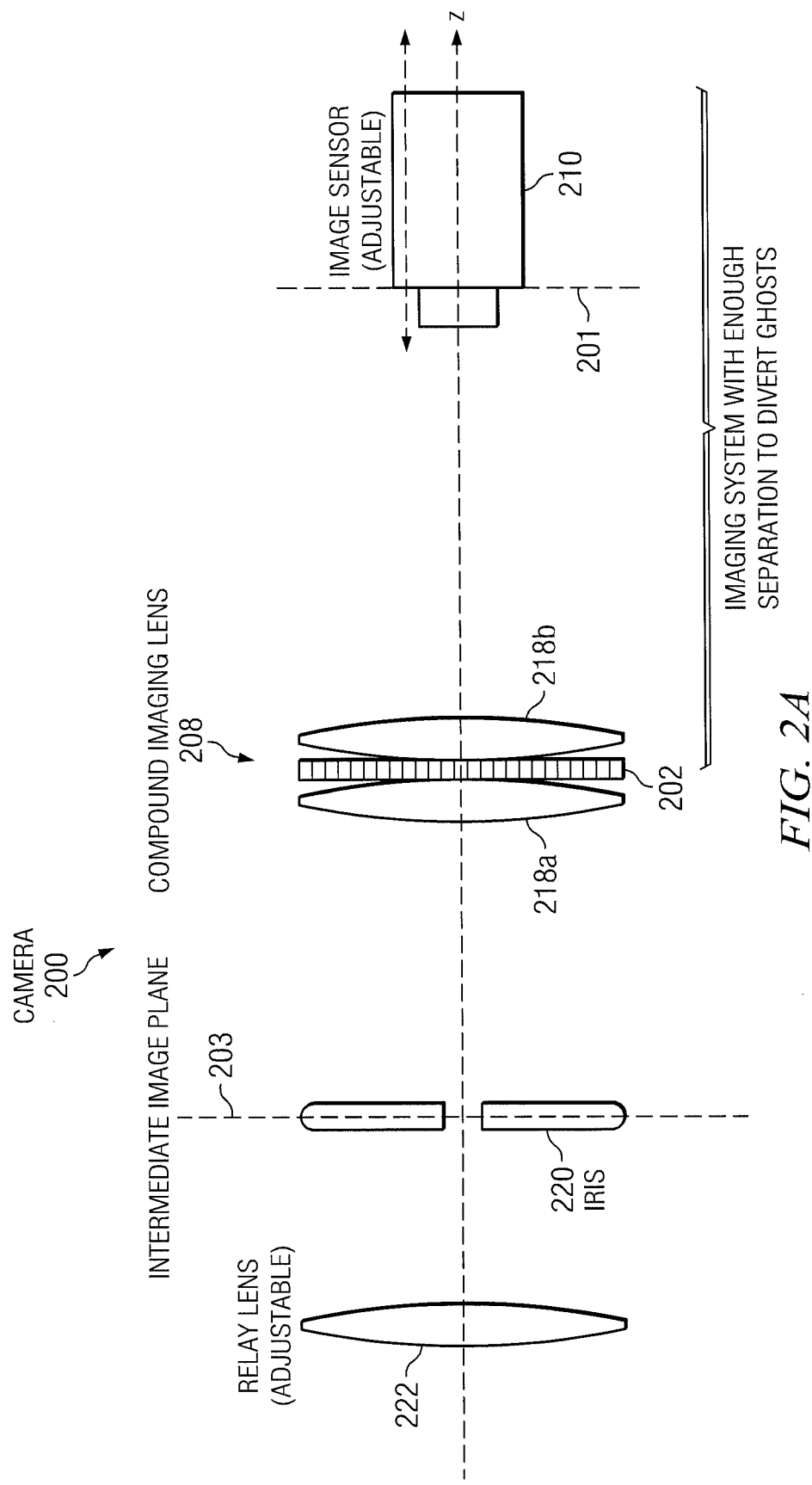
FIGS. 2A-2D are schematic diagrams of light field cameras that includes stops configured to limit the angular field of view and/or the range of angles incident on the SLM.

FIGS. 2A-2D show inventive cameras with stops and relay lenses that reduce the range of angles incident on the SLM and/or reduce the camera's angular field of view. For example, FIG. 2A shows a light field camera 200 with a relay lens 222 that images an object (not shown) to an intermediate image plane 203. An iris, or stop 220, in the intermediate image plane 203 limits the size or angular breadth of the object that can be imaged by the camera 200. In other words, the stop 220 determines the camera's field of view. The stop 220 also limits the range of incidence angles on the SLM 202, which prevents off-axis beams from producing undesired on-axis diffractions that would otherwise obscure the desired image. Those skilled in the art will also appreciate that there are other suitable ways of limiting the field of view and/or the range of angles incident on the SLM. For example, picking an imaging lens with a smaller numerical aperture and/or a longer focal length than the relay lens(es) reduces the angular range of rays that fall onto the SLM and/or the detector.

Light transmitted through the stop 220 illuminates a compound imaging lens 208 and an SLM 202, which spatially modulates the incident beam according to instructions from a processor (not shown). In this example, the lens 208 includes optical elements 218a and 218b disposed on opposite sides of the SLM 202. These elements 218a and 218b may be Fresnel lenses or plano-convex lenses, such as inexpensive injection-molded lenses, whose planar surfaces are bonded to or otherwise disposed about the SLM 202. As above, the compound imaging lens 208 images the cropped image in the intermediate image plane onto a detector 210 in the lens's image plane 201. The separation between the lens 208 and the detector 210 is sufficient to prevent ghosts due to diffraction from beams propagating at angles close to normal incidence (i.e., at or near $\theta_i=0$).

Figure 2B:
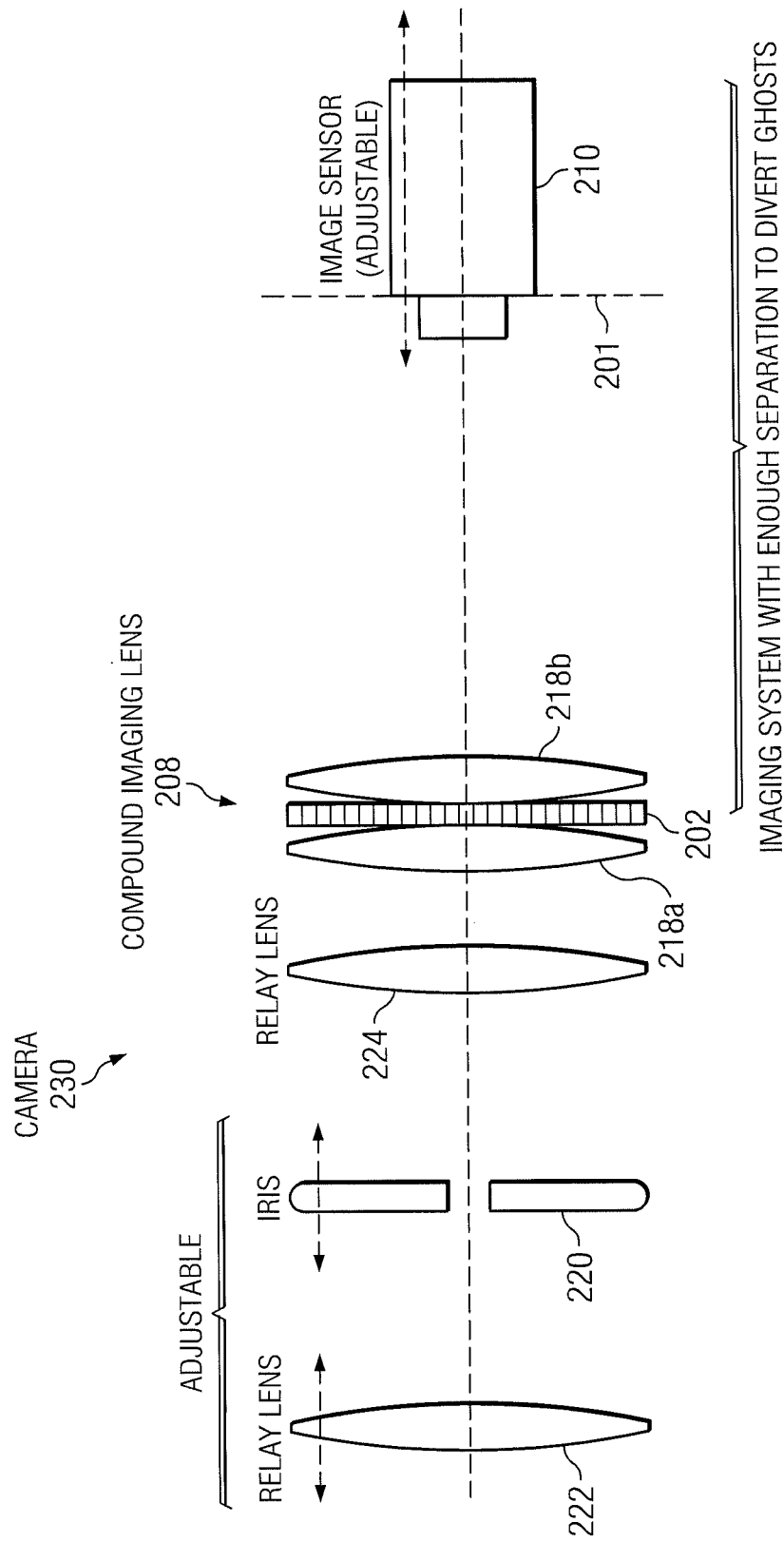
Figure 2C:
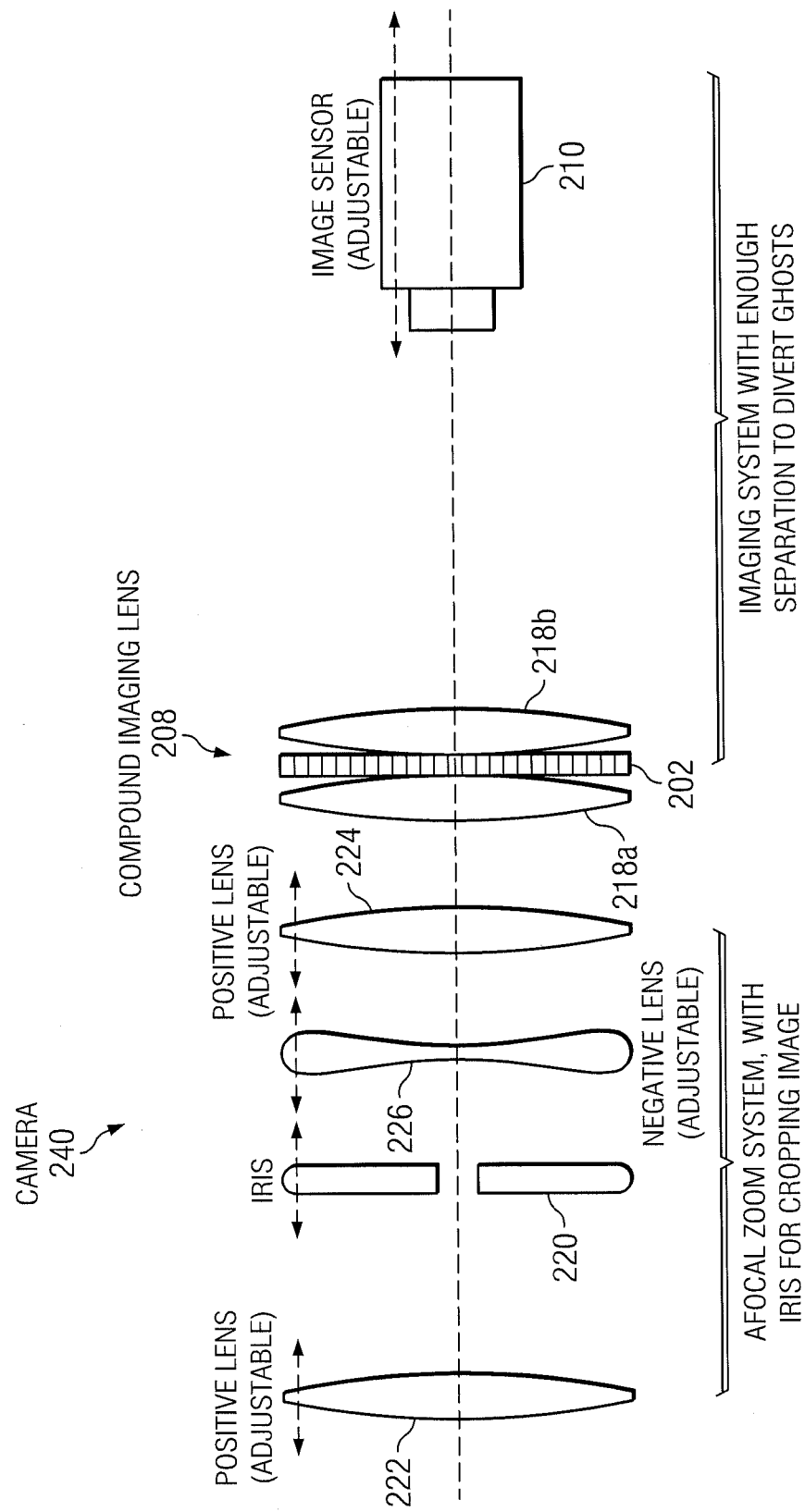

Inventive cameras may include additional lenses and/or other optical elements depending on the desired performance, e.g., the desired camera size, magnification, working distance, depth of field, cost, etc. For example, FIG. 2B shows a camera 230 that includes a second positive relay lens 224 disposed between the stop 220 and the compound imaging lens 208; the camera 240 in FIG. 2C also includes a negative lens 226 disposed between the stop 220 and the second positive relay lens 224. Adjusting the separation among the relay lenses 222, 224, and 226 changes the magnification and/or imaging condition. The clear aperture diameter and location of stop 220 can also be adjusted to maintain the desired system field of view and/or SLM angular field of view.

Placing the SLM 202 between optical elements 218a and 218b in the imaging lens 208 offers other previously unrecognized advantages: it reduces ghosts from beams impinging on the SLM at larger angles of incidence. To see why, recall that the first optical element 218a collects light diverging from the intermediate image plane 203, and the second element 218b transmits light that converges at the image plane 201. Thus, there is a plane between the first and second elements 218a and 218b where propagating light is characterized by rays that are roughly parallel to the optical axis. If the SLM 202 is between the two elements 218a and 218b, then it operates on propagating light is characterized by these roughly parallel rays. As a result, the light incident on the SLM 202 is travelling roughly parallel to the optic axis, so it does not produce ghosts whose positions deviate significantly from their positions for $\theta_i=0$.

The aperture edges on the back of the SLM 202 in the middle of a compound lens 208 are also less likely to block rays propagating at certain angles, effectively shading the rear elements. This effect, known as vignetting, reduces the effective lens opening for off-axis incident light. In addition, the transmissivity of liquid crystal material depends, in part, on the angle of incidence, so LC-SLMs can attenuate or block obliquely incident rays. Thus, LC-SLMs in the path of converging or diverging rays, such as LC-SLMs situated between the lens and the detector, can block or attenuate off-axis rays, reducing the amount of information available to reconstruct the 5D light field.

Figure 2D:
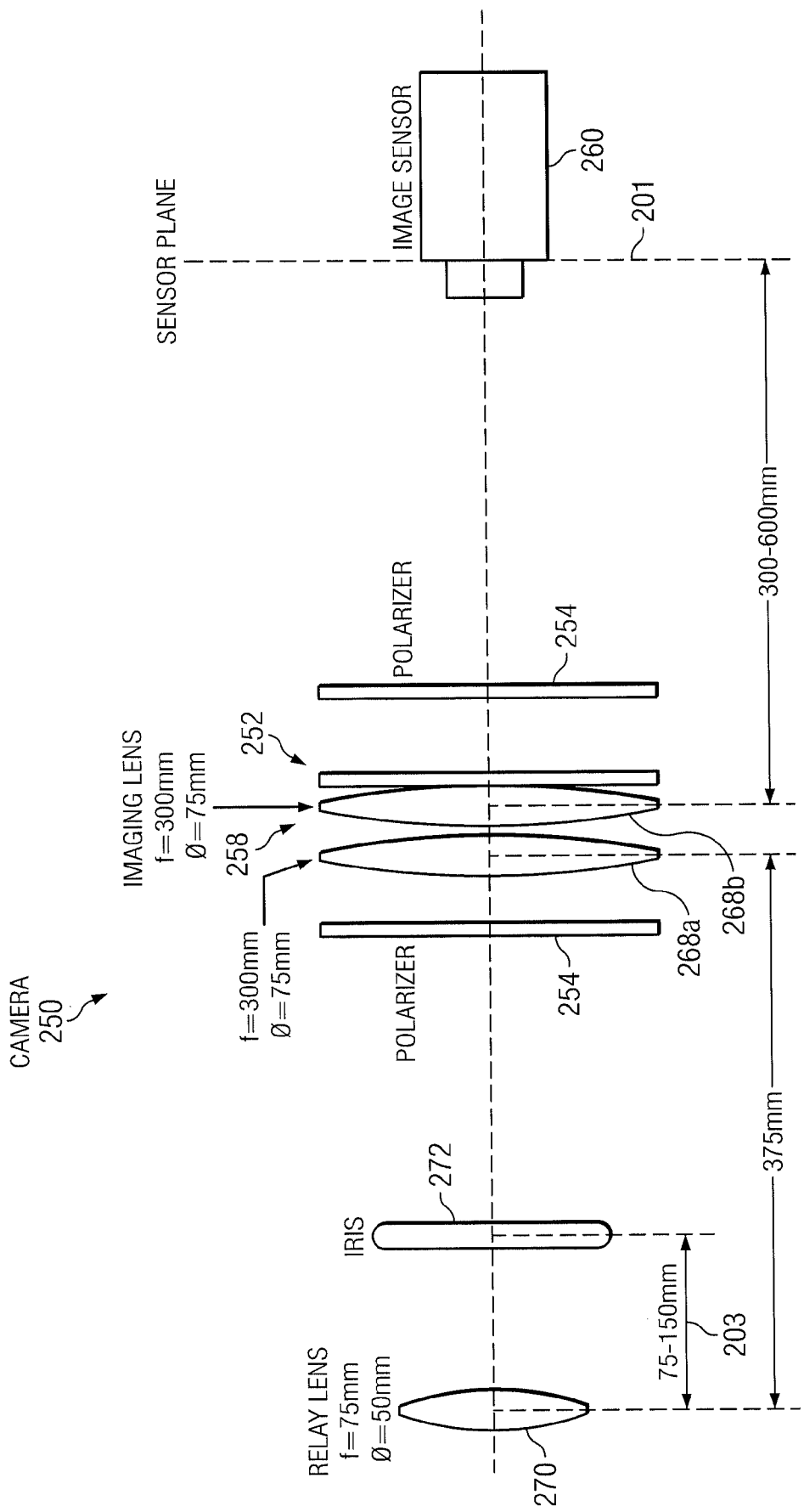

FIG. 2D shows a camera 250 constructed with using a LC-SLM 252, which is sandwiched between crossed polarizers 254, with a pixel pitch of $\Lambda=26$ microns. A relay lens 270 with a focal length of 75 mm and a clear aperture of 50 mm images an object (not shown) to an intermediate image plane 203 about 75-150 mm from the relay lens 270. An adjustable iris 272 with a clear aperture diameter of up to about 15 mm limits the angular field of view to about three degrees. A compound imaging lens 258 made of two optical elements 268a and 268b—both lenses with diameters of 75 mm and focal lengths of F=300 mm—images the intermediate image plane 203 onto an image sensor 260 with an active area whose width is about 4.8 mm by 6.4 mm.

Micromirror-Based SLMs for Increased Throughput and Coma-Corrected Imaging

Some transmissive SLMs necessarily attenuate transmitted beams. For example, LC-SLMs incorporate polarizers that reduce the radiance of unpolarized beams by 50%, not counting residual absorption of the polarizers and the liquid crystal material. The reduction in radiance degrades the signal-to-noise ratio (SNR) of the detected image, necessitating increased exposure times or more exposures to achieve a given SNR. Unfortunately, the exposure time and number of exposures can only be increased so much for dynamic scenes before the captured images become blurry or the scene changes beyond acceptable limits for 5D light field reconstruction.

Figure 3A:
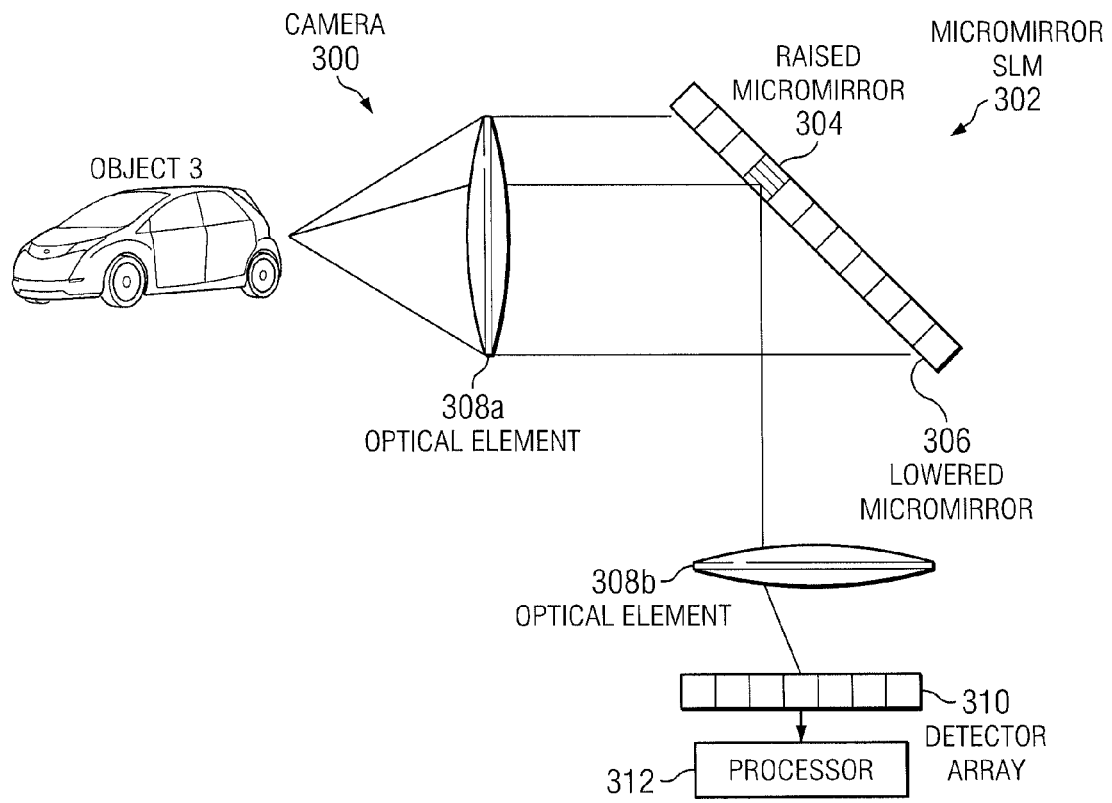
FIG. 3A is a schematic diagram of a light field camera with an actively addressable aperture defined by a micromirror-based SLM disposed between input and output surfaces of a lens that includes multiple optical elements.

FIG. 3A is a schematic diagram of an alternative camera 300 that uses a reflective SLM 302 instead of a transmissive SLM to define an actively addressable aperture for detecting images suitable for constructing 5D light fields. Here, a lens formed of first and second optical elements 308a and 308b images an object 3 onto a detector array 310 via an actively addressable aperture defined by one or more raised micromirrors 304 in the micromirror-based SLM 302. The raised micromirrors 304 reflect the incident beam towards the detector array 310, whereas lowered micromirrors 306 either do not reflect light or reflect light in a different direction, effectively blocking rays propagating towards the detector array 310. The micromirror-based SLM 302 may also include a light sink (not shown) that absorbs light rejected or reflected by the lowered micromirrors 306. Unlike apertures defined by LC-SLMs, which transmit only a fraction of incident light, the actively addressable aperture defined by the SLM 302 reflects all the incident light, yielding a detected 2D image with high SNR.

A processor 312 coupled to the detector array 310 constructs a 5D light field associated with the object 3 from the 2D images acquired with detector array 310. The processor 312 may also be coupled to the reflective SLM 302 for controlling the size, shape, and/or position of the aperture by selectively changing the tilt angle of the micromirrors 304 and 306 in the SLM 302.

Figure 3B:
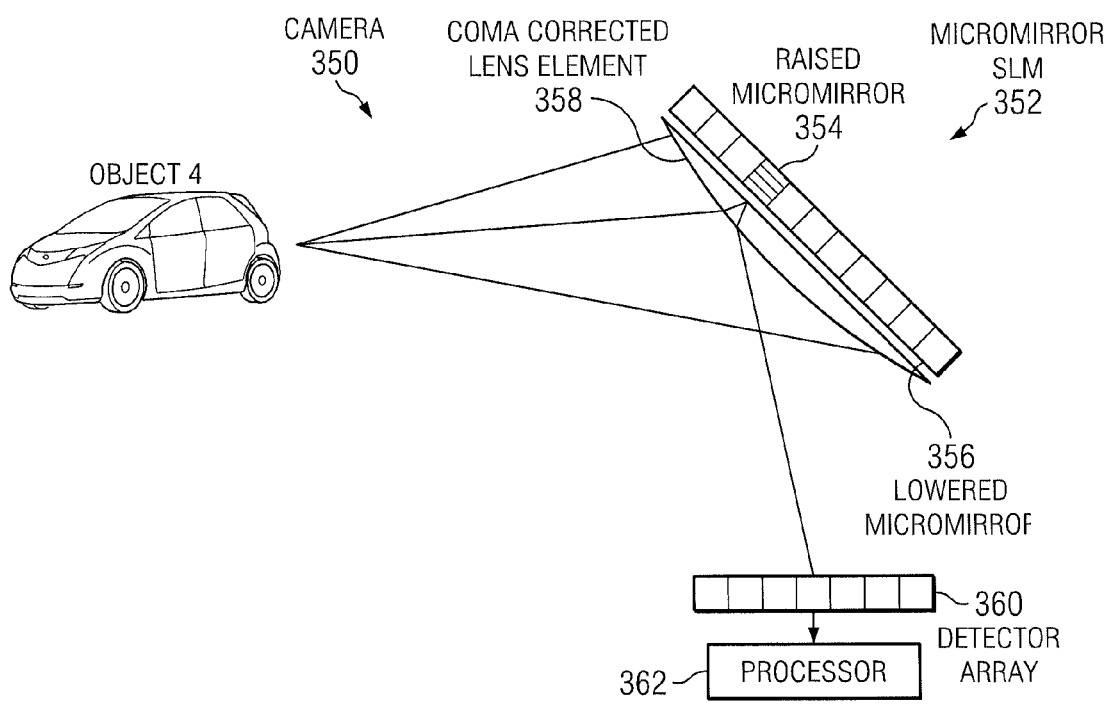
FIG. 3B is a schematic diagram of a coma-corrected light field camera with a micromirror-based SLM.

FIG. 3B is a schematic diagram of a camera 350 capable of acquiring coma-corrected 2D images of an object 4. Coma occurs when a lens focuses off-axis rays to different planes, resulting in a cometlike image formed of superposed circles of increasing size. (For more on coma, see, e.g., D. C. O'Shea, "Elements of Modern Optical Design," John Wiley & Sons, 1985, incorporated herein by reference in its entirety.) A coma-corrected lens element 358, which is bonded, affixed, and/or aligned to a micromirror SLM 352, images a scene associated with the object 4 onto a detector array 360 coupled to a processor 362. The tilt of the lens element 358 with respect to the optical axis determines the tilt of the image onto the detector array 360; the detector array 360 may be tilted accordingly to compensate for any resultant distortion. Alternatively, distortion due to tilt may be compensated using additional optical elements or in postprocessing. Light propagates from the object 4 through the lens element 358 to the micromirror SLM 352. Raised micromirror elements 354 form an actively addressable aperture that reflects light back through the lens element 358 to the detector array 360, whereas lowered micromirror elements 356 either reflect light in a different direction or do not reflect light at all.

Actively Addressable Aperture Positions, Shapes, and Sizes

Figure 4:
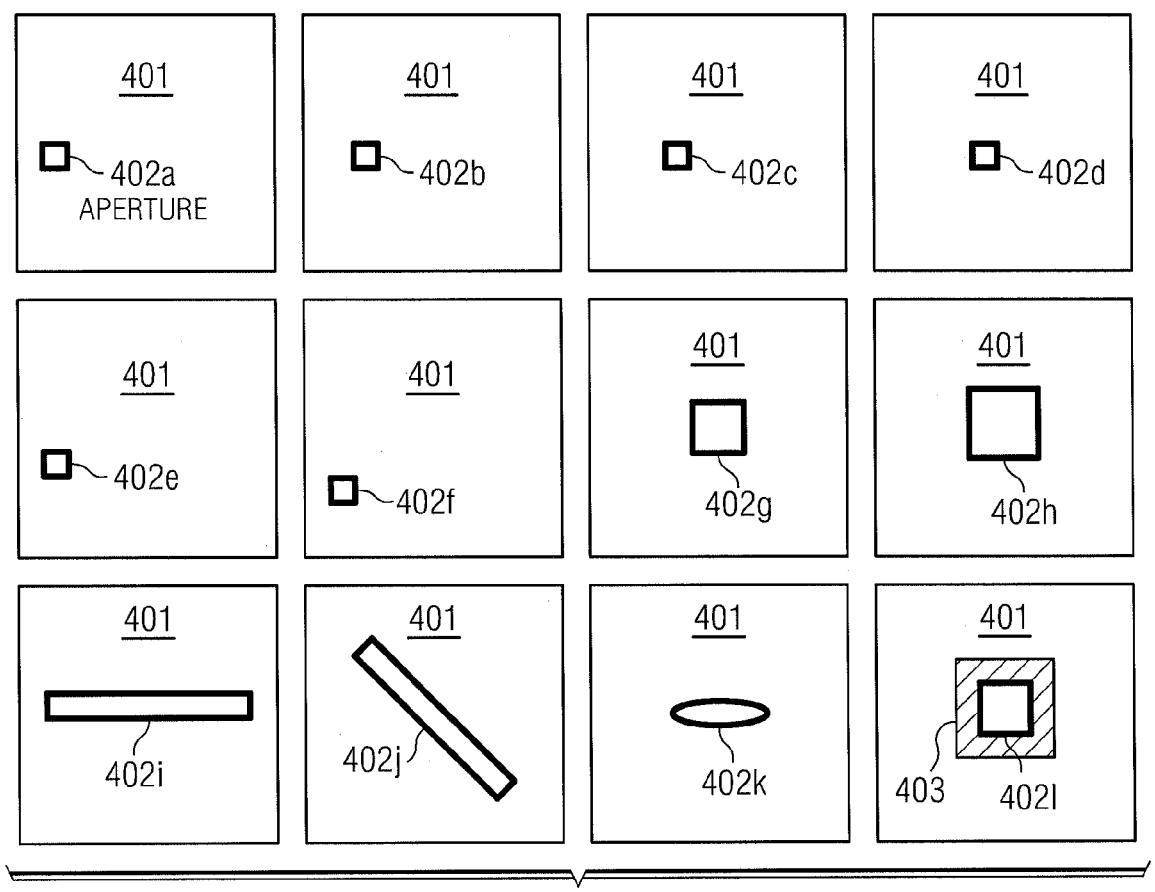
FIG. 4 shows actively addressable apertures of various transverse positions, sizes, and shapes.

FIG. 4 shows an SLM 401 that defines a variety of different actively addressable apertures 402a-402l. Moving the aperture left or right (apertures 402a-402d) and up or down (apertures 402e and 402f) allows acquisition of 2D images from different angles. In general, the more 2D images and angles acquired, the better the possible reconstruction of the 5D light field. Although movement in a gridlike pattern is preferred, other movement patterns may be used, depending on the application. For example, undersampled patterns can be used to image scenes about which some a priori knowledge exists.

Similarly, capturing images with alternately opening two circular apertures at either edge of the lens results in data suitable for generating stereoscopic 3D movies.

Enlarging the aperture (402g and 402h) increases the flux through the aperture, increasing the maximum possible shutter speed. Similarly, changing the shape of the aperture enables determination of additional information from a single 2D image. For instance, images captured via elliptically shaped apertures, such as aperture 402k, can be used to derive depth information about the scene being imaged. Square apertures are helpful for covering the entire aperture plane in a tidy pattern, whereas circular aperture holes leave a more natural blur circle. Apodizing, shaping, or tapering apertures positioned at the edges of the lens may be useful for capturing the scene precisely. For example, aperture-based masks can be used for image correlation using the techniques disclosed in U.S. Pat. No. 5,850,485 to Douglas P. Hart, incorporated herein by reference in its entirety. Feedback for changing the aperture size, position, and shape could come from live processing that identifies undersampled regions and triggers additional image acquisition as needed. Actively addressable apertures can also take the form of more sophisticated amplitude and/or phase masks.

SLMs with elements that can be tuned to partially transmit light, such as LC-SLMs, can also be used to create apodized apertures, such as the one shown at the lower right corner of FIG. 4. A ring of partially transmitting elements 403 surrounds fully transmitting elements 402l that define the center of the aperture. The partially transmitting elements 403 create a "soft edge" that suppresses high-frequency ripples in images detected via the aperture 402l.

Acquiring and Constructing 5D Light Fields

Figure 5A:
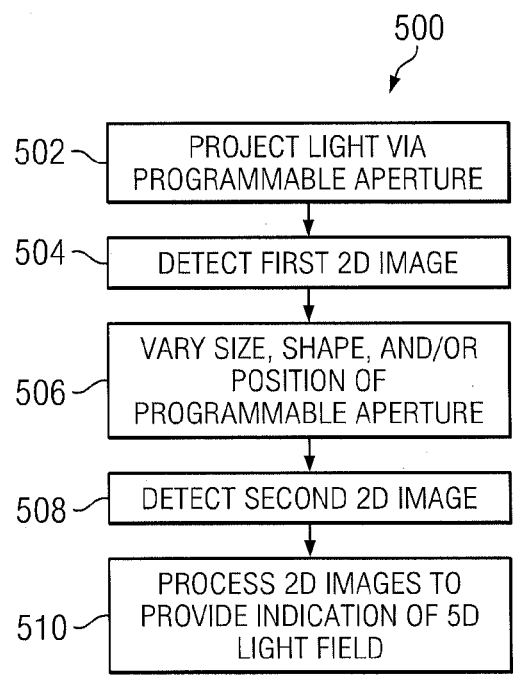
FIG. 5A is a flow diagram that shows how to acquire an indication of a 5D light field with an actively addressable aperture.

FIG. 5A shows a flow diagram 500 that depicts acquisition and processing of 2D images via an actively addressable aperture. First, light from a scene is projected or imaged onto a detector array via an actively addressable aperture (502), such as the actively addressable apertures shown in FIG. 4. A detector array captures a 2D image corresponding to the scene viewed through the actively addressable aperture (504) before the actively addressable aperture is shifted, enlarged, or otherwise varied (506). After the position, size, and/or shape of the actively addressable aperture is changed, the detector array captures a second 2D image corresponding to the scene viewed through the altered actively addressable aperture (508). Processing the 2D images yields a 5D light field that represents the scene (510).

Figure 5B:
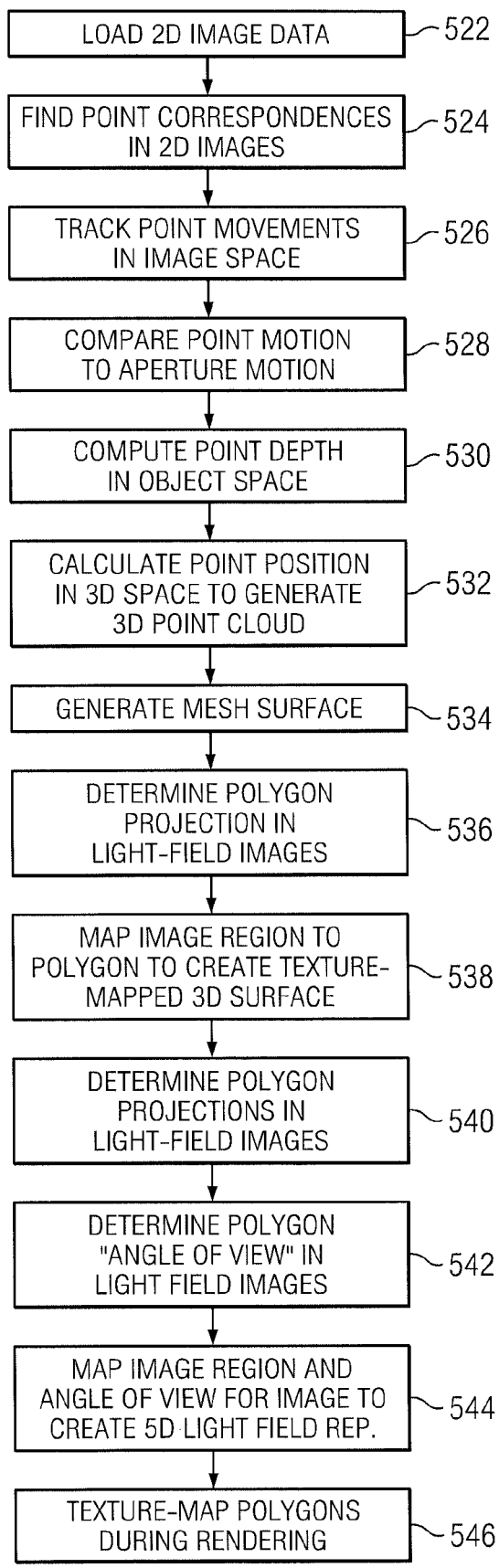
FIG. 5B is a flow diagram that shows how to generate a representation of a 5D light field from 2D images acquired with an actively addressable aperture.

FIG. 5B illustrates how a processor uses 2D images to construct representations of a 3D point cloud and 5D light field associated with a given object. First, the processor loads the 2D image data (522) from memory. Next, the processor finds point correspondences from one image to the next (524). Once the processor has determined how the points in different images correspond to each other, the processor performs the following operations for each point: it tracks each point's movement in image space across the light field (526); it compares this movement to the movement (position) and/or shape of the actively addressable aperture used to acquire the corresponding images (528); it computes, based on these movements, each point's depth in object space relative to the camera (530); and it calculates each point's actual position in 3D space based on the camera's field of view and/or other spatial cues (532). The actual positions of the points in 3D space form a 3D point cloud.

The processor uses the 3D point could to generate a 3D surface according to the following routine. First, the processor creates a tessellation, or mesh surface, using the 3D point cloud (534). Tessellation is well-known in the art, and can be performed used Poisson surface reconstruction, the ball pivoting algorithm, marching cubes, or any other suitable technique. The processor overlays image data onto the polygons that form the surface mesh by determining each polygon's projection into the various 2D images (536), then mapping the corresponding image region to the polygon in question (538). For example, the processor may determine projections using an image acquired with an aperture centered in the SLM (the central-aperture image). This yields a representation of a texture-mapped 3D surface (i.e., a representation of color values at each 3D position).

To create the representation of the original 5D light field associated with the object, the processor determines each polygon's projection into each light field image (540). Once the processor has determined the projection of a given polygon, it can determine the angle of view for each light field image (542). Mapping the image region for each image to each polygon, along with the angle of view, gives the representation of the original 5D light field (544).

The processor can also render the representation of the 5D light field to user, e.g., on a display or other viewer. During rendering, the processor texture maps each polygon with the mapped image data having an angle of view closest to the current view (546). As the object appears to rotate in the display, the texture mapping changes corresponding to the angle-dependent irradiance pattern of each point as captured in the original light field.

Figure 6A:
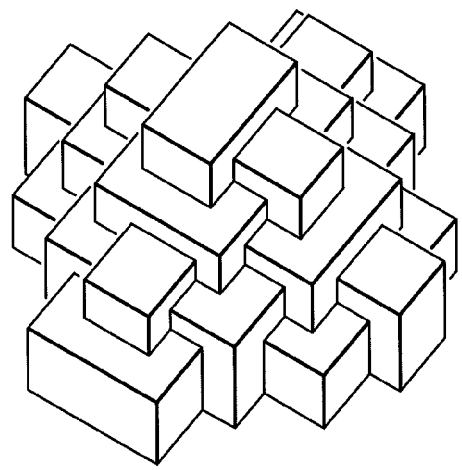
FIG. 6A is a picture of wooden puzzle captured with a light field camera.
Figure 6B:
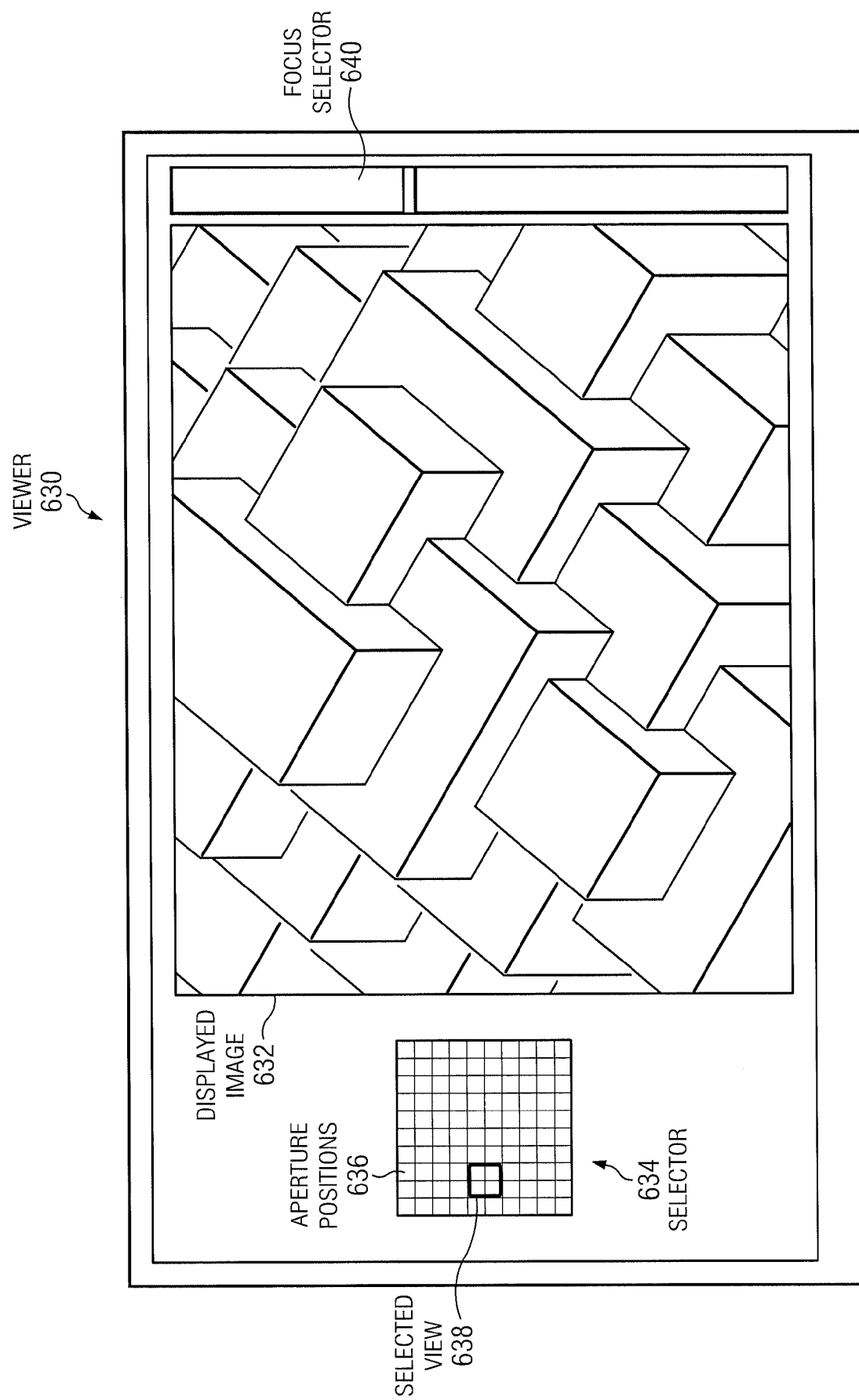
FIG. 6B is a diagram of a light field viewer showing the wooden puzzle of FIG. 6A.
Figure 6C:
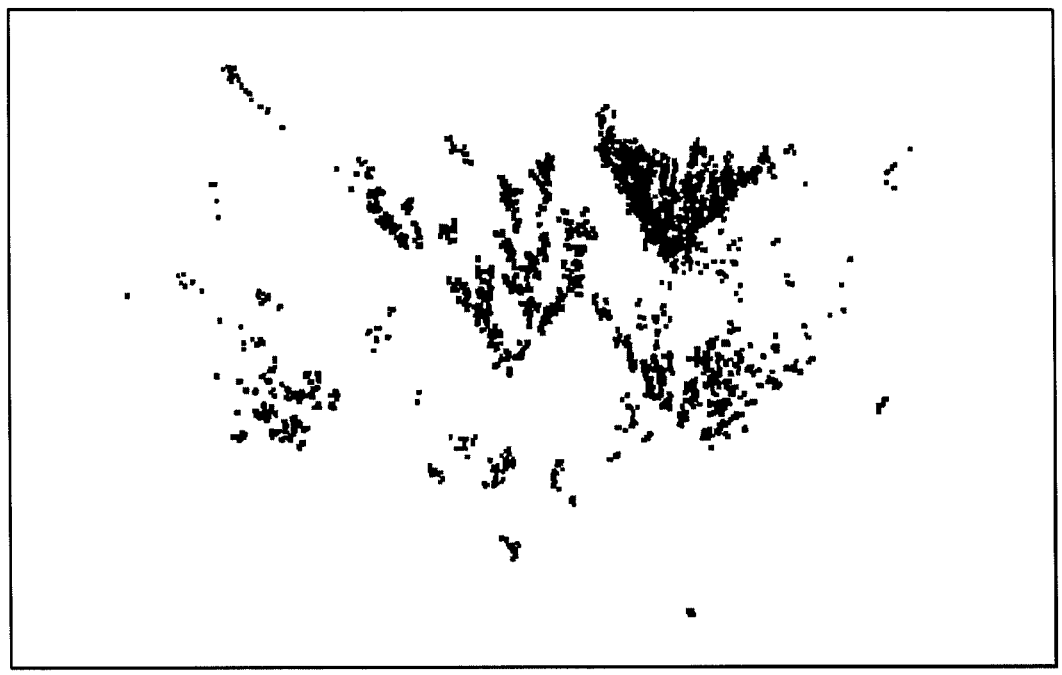
FIG. 6C is a diagram of a point cloud associated with the surface of the wooden puzzle of FIG. 6A.

FIGS. 6A-6C represent various aspects of a 5D light field associated with a wooden puzzle. FIG. 6A is a 2D image of the wooden puzzle captured with a light field camera. FIG. 6B is a viewer 630 that shows 2D images 632 of the wood toy as a function of actively addressable aperture position, actively addressable aperture size, and focus. Changing the actively addressable aperture position with a selector 634 shifts the perspective at which the image 632 appears in the viewer 630. Gray points 636 shown on the selector 634 represent the actively addressable aperture positions at which images 632 were acquired, and a dark point 638 represents the actively addressable aperture position corresponding to the view on display. Similarly, changing the focus with a focus selector 640 causes a corresponding change in the displayed image.

FIG. 6C is a plot of a point cloud generated from the middle 16 images from a light field of the wooden puzzle shown in FIG. 6A. The point cloud roughly follows the surfaces of the wooden puzzle; to see how, align the front corners of the triangular bunches with their corresponding corners in the light field. The upper-right-most triangular cluster is the top surface of the upper-right-most block in the light field, and so forth.

Applications for 5D Light Field Detection

A related technology has been developed that allows the light field or a 3D model to be viewed intuitively on a 2D computer screen, 3D computer screen, or other display. By mounting a webcam on top of the screen (like many modern laptops come stock with), and using this webcam to track the user's eyes in real time, the computer can display the appropriate perspective image from the 2D grid, based upon the user's eyes' position relative to the screen. So, as the user moves his head left and right and up and down, the perspective changes accordingly, like it would if the object were in front of the user instead of the 2D screen. This can be further combined with the anaglyph effect to create the 3D "popping" effect along with the perspective changes.

Figure 7:
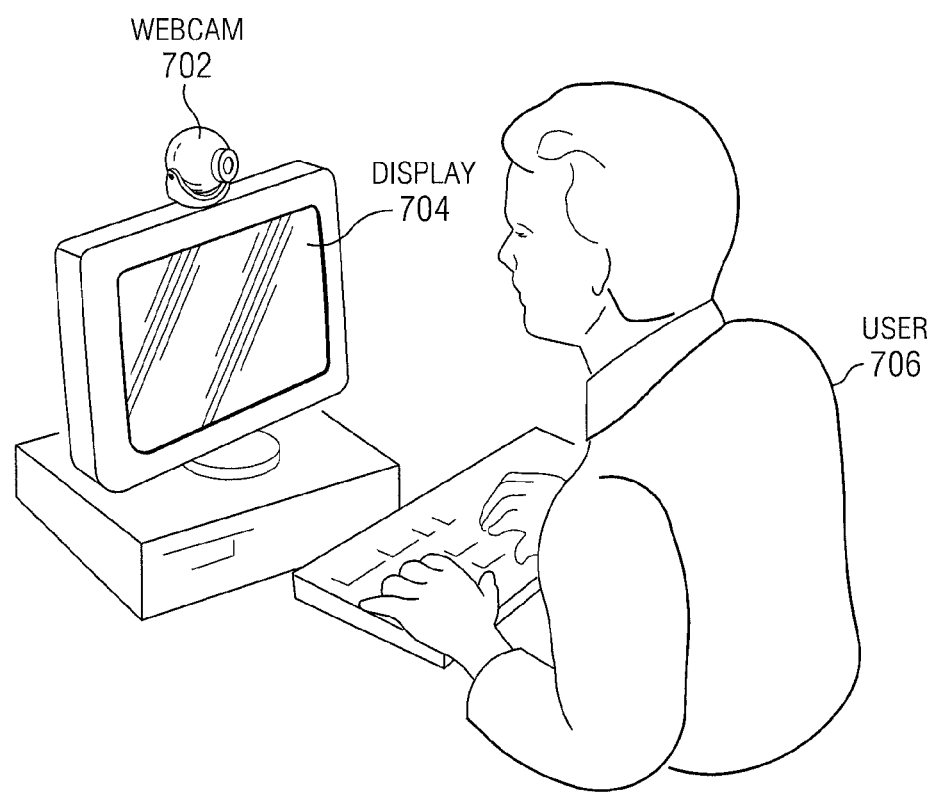
FIG. 7 is a schematic diagram of a webcam and display that respond to changes in the position and/or gaze angle of the user's eyes by changing the perspective of the image on the display.

FIG. 7 shows a webcam 702 coupled to a computer (not shown) and display 704 configured to alter the perspective of images shown on the display in responses to changes in position and attitude of a user's head or gaze. The webcam 702 may include optics, an actively addressable aperture, and a detector array similar or identical to those in the cameras described above, although it does not have to be. Standard webcams (i.e., webcams without actively addressable apertures) can also acquire angle-based viewing information using an inverse aperture effect: because the user's eyes change direction, but the webcam 702 is fixed, the angle between the user's eyes and the webcam 702 changes, resulting in a 2D image formed by the webcam 702 that can be acquired and captured as described below.

The webcam 702 detects and processes 2D images into a 5D light field that indicates the direction in which the user 706 is looking. As the user 706 looks in a different direction, the 5D light field changes in a way that can be detected with the webcam 702, which transmits data to the computer that indicates the magnitude and direction of the change. In response, the computer alters the perspective of the image shown on the display 704 based upon the 3D/4D/5D light field model.

While light field cameras are eminently useful for visible-light photography, they can be adapted for imaging at any wavelength, including X-ray imaging for medical uses and infrared imaging for military and industrial applications. The eye-tracking perspective-changing display system could even be used for images captured with other types of electromagnetic detectors, including magnetic resonance imaging (MRI), terahertz, and radio-frequency imagers. Finally, the high-precision 3D movies captured with the 5D light field cameras described above can be used for machine vision applications, including nondestructive testing and autonomous vehicle navigation.

While this invention has been particularly shown and described with references to example embodiments thereof, it will be understood by those skilled in the art that various changes in form and details may be made therein without departing from the scope of the invention encompassed by the appended claims. For example, alternative SLMs, including Pockels cell SLMs, reflective LC-SLMs, and optically addressed SLMs can be used to define the actively addressable aperture.

What is claimed is:

1. A camera, comprising:
   a lens arranged to produce an image of an object in an image plane located a distance L from the lens;
   an actively addressable aperture defined by a spatial light modulator (SLM) disposed between the object and the image plane, the SLM including elements spaced at a pitch of $\Lambda$;
   a detector disposed in the image plane and configured to sense two-dimensional images transmitted or reflected through the actively addressable aperture, the detector having an active area with a maximum transverse dimension of about $D<2L\lambda/\Lambda$, where $\lambda$ is a wavelength of the two-dimensional images sensed by the detector; and
   a processor operably coupled to the SLM and to the detector, the processor configured to vary at least one of a position, size, and shape of the actively addressable aperture and to generate a representation of a four-dimensional light field associated with the object based on the two-dimensional images sensed by the detector.

2. A camera as in claim 1 wherein the lens has a focal length F that is within a range of distances from about L to about 2L.

3. A camera as in claim 1 further including:
   a stop configured to limit the angular field of view of the lens to less than $\arcsin(\lambda/\Lambda)$.

4. A camera as in claim 1 further including:
   a stop configured to limit the angle of incidence of light onto the SLM to within a range of angles from about 0 degrees to about 20 degrees about an axis perpendicular to a plane defined by the actively addressable aperture.

5. A camera as in claim 4 further including:
   a relay lens disposed between the object and the lens and configured to produce another image of the object at an intermediate plane between the object and the image plane, and wherein the stop is disposed in the intermediate plane.

6. A camera as in claim 1 wherein the lens includes a first optical element disposed between the SLM and the object and a second optical element disposed between the SLM and the image plane.

7. A camera as in claim 6 wherein at least one of the first and second optical elements is a Fresnel lens.

8. A camera as in claim 6 further including:
   a relay lens disposed between the object and the lens, wherein the relay lens is configured to produce another image of the object at an intermediate plane between the object and the image plane.

9. A camera as in claim 1 wherein the SLM is bonded to the lens.

10. A camera as in claim 1 wherein the elements in the SLM are transmissive elements configured to define the actively addressable aperture by selectively transmitting incident light in response to a signal from the processor.

11. A camera as in claim 10 wherein at least some of the transmissive elements are further configured to define an edge of the actively addressable aperture by selectively partially transmitting light in response to a signal from the processor.

12. A camera as in claim 1 wherein the elements in the SLM are reflective elements configured to define the actively addressable aperture by selectively reflecting incident light in a desired direction in response to a signal from the processor.

13. A camera as in claim 12 wherein at least some of the reflective elements are further configured to only partially reflect at least some of the light from the object.

14. A camera as in claim 1 wherein the processor is further configured to vary at least one of a position, size, and shape of the actively addressable aperture in response to one or more of the two-dimensional images sensed by the detector.

15. A camera as in claim 1 wherein the processor is further configured to vary the actively addressable aperture according to a predetermined pattern.

16. A camera as in claim 1 wherein the processor is further configured to produce a representation of a five-dimensional light field associated with the object based on the two-dimensional images sensed by the detector.

17. A camera as in claim 1, further including:
    memory operably coupled to the detector and configured to store plural sets of data, each set of data indicative of a two-dimensional image corresponding to a particular actively addressable aperture position, size, or shape.

18. A camera as in claim 1 in combination with a display configured to render an image based on an orientation of the object relative to the camera.

19. A method of acquiring a light field associated with an object, comprising:
    projecting two-dimensional images of an object to an image plane via a lens located a distance L from the image plane;
    spatially modulating the light field with an actively addressable aperture defined by a spatial light modulator (SLM) disposed between the object and the image plane, the SLM including elements spaced at a pitch of $\Lambda$;

detecting a first two-dimensional image with a detector disposed in the image plane, the detector having an active area with a maximum transverse dimension of about $D<2L\lambda/\Lambda$, where $\lambda$ is a wavelength of the two-dimensional images sensed by the detector;

varying at least one of position, size, and shape of the actively addressable aperture;

detecting a second two-dimensional image with the detector; and processing data indicative of the detected modulated light fields to generate a representation of a four-dimensional light field associated with the object based on the two-dimensional images sensed by the detector.

20. A method as in claim 19 wherein the lens has a focal length F that is within a range of distances from about L to about 2L.

21. A method as in claim 19 further including:
limiting the angular field of view of the lens to less than $\arcsin(\lambda/\Lambda)$.

22. A method as in claim 19 further including:
limiting the angle of incidence of light onto the SLM to within a range of angles from about 0 degrees to about 20 degrees about an axis perpendicular to a plane defined by the actively addressable aperture.

23. A method as in claim 22 further including:
forming another image of the object at an intermediate plane between the object and the image plane, and wherein limiting the angle of incidence of light onto the SLM includes blocking light with a stop disposed in the intermediate plane.

24. A method as in claim 19 wherein the lens includes a first optical element disposed between the SLM and the object and a second optical element disposed between the SLM and the image plane.

25. A method as in claim 24 wherein at least one of the first and second optical elements is a Fresnel lens.

26. A method as in claim 24 further including:
forming another image of the object at an intermediate plane between the object and the lens.

27. A method as in claim 19 wherein the SLM is bonded to the lens.

28. A method as in claim 19 wherein spatially modulating the light field with the actively addressable aperture includes selectively transmitting the light field in response to a signal from a processor.

29. A method as in claim 28 wherein spatially modulating the light field with the actively addressable aperture further includes selectively partially transmitting at least a portion of the light field.

30. A method as in claim 19 wherein spatially modulating the light field with the actively addressable aperture includes selectively reflecting the light field in a desired direction in response to a signal from a processor.

31. A method as in claim 30 wherein spatially modulating the light field with the actively addressable aperture further includes only partially reflecting at least a portion the light field.

32. A method as in claim 19 wherein varying at least one of position, size, and shape of the actively addressable aperture occurs in response to one or more of the two-dimensional images sensed by the detector.

33. A method as in claim 19 wherein varying at least one of position, size, and shape of the actively addressable aperture occurs according to a predetermined pattern.

34. A method as in claim 19 further including:
producing a representation of a five-dimensional light field associated with the object based on the two-dimensional images sensed by the detector.

35. A method as in claim 19 further including:
rendering an image on a display based on the representation of the four-dimensional light field associated with the object.

* * * * *